US008670986B2

(12) United States Patent
Arvanaghi et al.

(10) Patent No.: US 8,670,986 B2
(45) Date of Patent: Mar. 11, 2014

(54) METHOD AND APPARATUS FOR MASKING SPEECH IN A PRIVATE ENVIRONMENT

(71) Applicant: Medical Privacy Solutions, LLC, Potomac, MD (US)

(72) Inventors: Babak Arvanaghi, Vienna, VA (US); Joel Fechter, Potomac, MD (US)

(73) Assignee: Medical Privacy Solutions, LLC, Potomac, MD (US)

( * ) Notice: Subject to any disclaimer, the term of this patent is extended or adjusted under 35 U.S.C. 154(b) by 0 days.

(21) Appl. No.: 13/786,738

(22) Filed: Mar. 6, 2013

(65) Prior Publication Data

US 2013/0185061 A1 Jul. 18, 2013

Related U.S. Application Data

(60) Provisional application No. 61/709,596, filed on Oct. 4, 2012.

(51) Int. Cl.
*G10L 15/00* (2013.01)

(52) U.S. Cl.
USPC ............................ 704/273; 704/278; 380/253

(58) Field of Classification Search
USPC .................................. 704/273, 278; 380/253
See application file for complete search history.

(56) References Cited

U.S. PATENT DOCUMENTS

| | | | | |
|---|---|---|---|---|
| 5,526,421 | A | 6/1996 | Berger et al. | |
| 5,781,640 | A | 7/1998 | Nicolino, Jr. | |
| 7,143,028 | B2 | 11/2006 | Hillis et al. | |
| 7,184,952 | B2 | 2/2007 | Hillis et al. | |
| 7,194,094 | B2 | 3/2007 | Horrall et al. | |
| 7,363,227 | B2 * | 4/2008 | Mapes-Riordan et al. | 704/273 |
| 7,376,557 | B2 | 5/2008 | Specht et al. | |
| 7,460,675 | B2 | 12/2008 | L'Esperance et al. | |
| 7,505,898 | B2 | 3/2009 | Hillis et al. | |
| 8,065,138 | B2 | 11/2011 | Akagi et al. | |
| 8,229,130 | B2 | 7/2012 | Paradiso et al. | |
| 2004/0125922 | A1 | 7/2004 | Specht | |
| 2005/0065778 | A1 | 3/2005 | Mastrianni et al. | |
| 2006/0109983 | A1 * | 5/2006 | Young et al. | 380/252 |
| 2006/0247919 | A1 * | 11/2006 | Specht et al. | 704/201 |
| 2006/0247924 | A1 * | 11/2006 | Hillis et al. | 704/213 |
| 2009/0175484 | A1 | 7/2009 | Saint Vincent et al. | |

OTHER PUBLICATIONS

Speech Privacy Systems, "VoiceArrest VA-300 Sound Masking Control Module" [online] [retrieved on Jun. 16, 2011], Retrieved from the Internet: <URL: http://www.speechprivacysystems.com/store/white-noise-for-individual-office/voicearrest-va-30-sound-masking-control-module-1.html>, 1 page.

(Continued)

*Primary Examiner* — Daniel D Abebe
(74) *Attorney, Agent, or Firm* — Cooley LLP

(57) ABSTRACT

A speech masking apparatus includes a microphone and a speaker. The microphone can detect a human voice. The speaker can output a masking language which can include phonemes resembling human speech. At least one component of the masking language can have a pitch, a volume, a theme, and/or a phonetic content substantially matching a pitch, a volume, a theme, and/or a phonetic content of the voice.

19 Claims, 3 Drawing Sheets

(56) References Cited

OTHER PUBLICATIONS

Speech Privacy Systems, "The Benefits of Advanced Sound Masking Technology" [online] [retrieved on Jun. 16, 2011] Retrieved from the Internet: <URL: http://www.speechprivacvsystems.com/voicear-rest-sound-masking-systems/soundmasking>, 4 pages.

Axis Technology, LLC, "DMsuite—Repeatable Data Masking" [online] [retrieved on Jun. 16, 2011] Retrieved from the Internet: <URL: http://www.axistechnologyllc.com/dmsuite>, 3 pages.

Speech Privacy Systems, "HIPAA Privacy for Doctors and Medical Professionals" [online] [retrieved on Jun. 16, 2011] Retrieved from the Internet: <URL: http://www.speechprivacysystems.com/confi-dentiality-main/hipaa-privacy/>, 4 pages.

Glory Ltd. "Newly-developed Speech Privacy Protection System "Voice Guard QG-11"", Aug. 23, 2011, 2 pages.

Glory Ltd. Sound Space Providing Service combining the "High-resolution audio system" and "Speech privacy protection system", Aug. 30, 2011.

International Search Report and Written Opinion for PCT/US13/63459, mailed Nov. 13, 2013.

* cited by examiner

FIG. 1
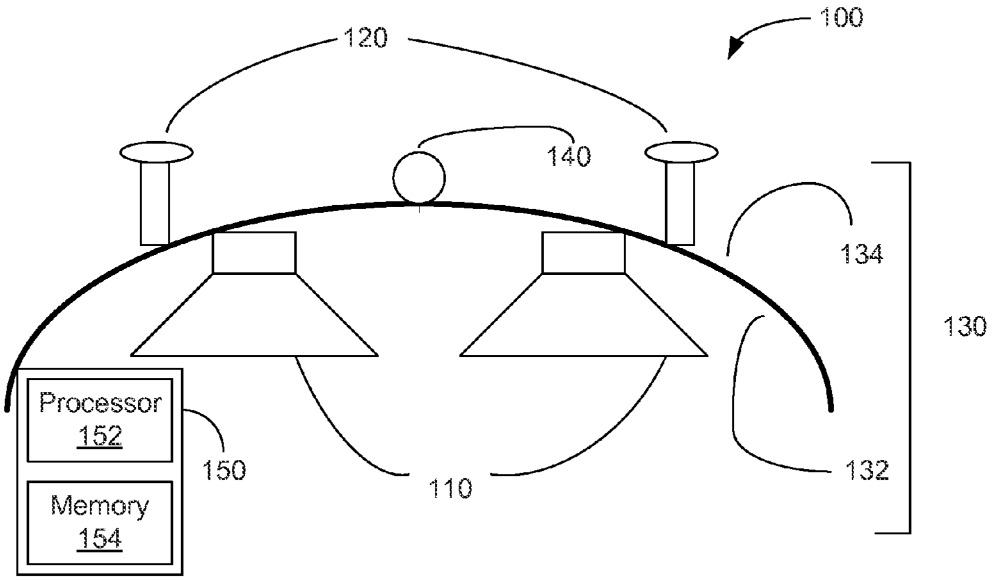
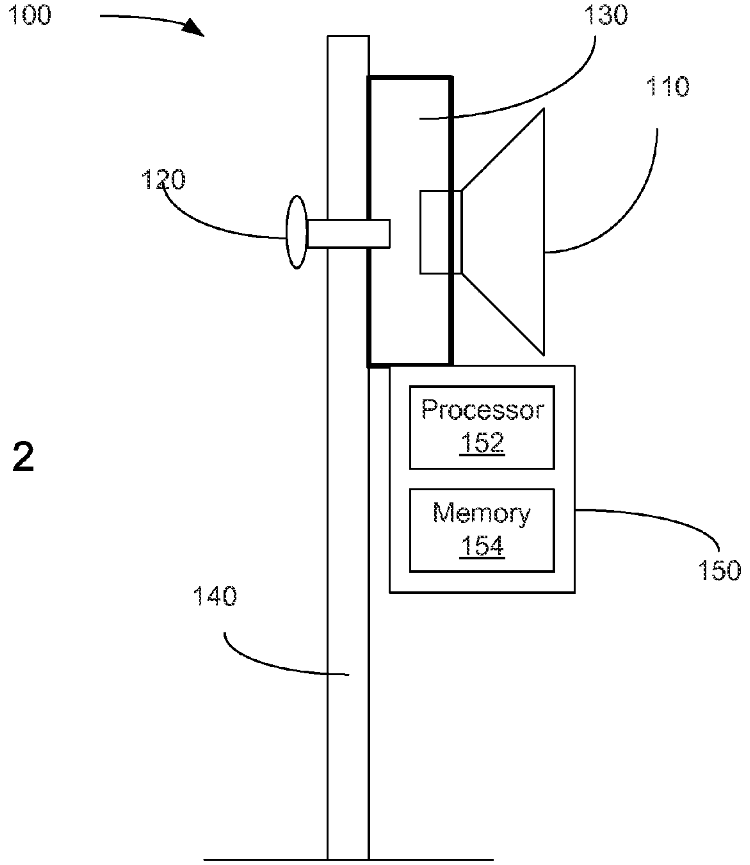
FIG. 2

METHOD AND APPARATUS FOR MASKING SPEECH IN A PRIVATE ENVIRONMENT

CROSS REFERENCE TO RELATED APPLICATIONS

This application claims priority to U.S. Provisional Patent Application No. 61/709,596, filed Oct. 4, 2012, entitled "Methods and Apparatus for Masking Speech in a Private Environment," the disclosure of which is incorporated herein by reference in its entirety.

BACKGROUND

The embodiments described herein relate to methods and apparatus for masking speech in a private environment, such as a hospital room. More specifically, some embodiments describe an apparatus operable to detect speech in a private environment and play masking sounds to obfuscate the speech so that the speech becomes unintelligible to unintended listeners.

Some known methods for masking speech include speakers, permanently mounted in a building, and configured to play background noise, such as static, intended to drone out private conversations. Such known methods are unpleasant to listeners, are marginally effective in spaces where the unintended listener and the intended listener share a space (such as a common hospital room), and often involve expensive installation. Accordingly, a need exists for a portable apparatus that can employ methods for masking speech using pleasing sounds that are effective in close-quarters.

BRIEF DESCRIPTION OF THE DRAWINGS

FIG. 1 is a top view of an apparatus, according to an embodiment.

FIG. 2 is a side view of an apparatus, according to an embodiment.

DETAILED DESCRIPTION

Figure 3:
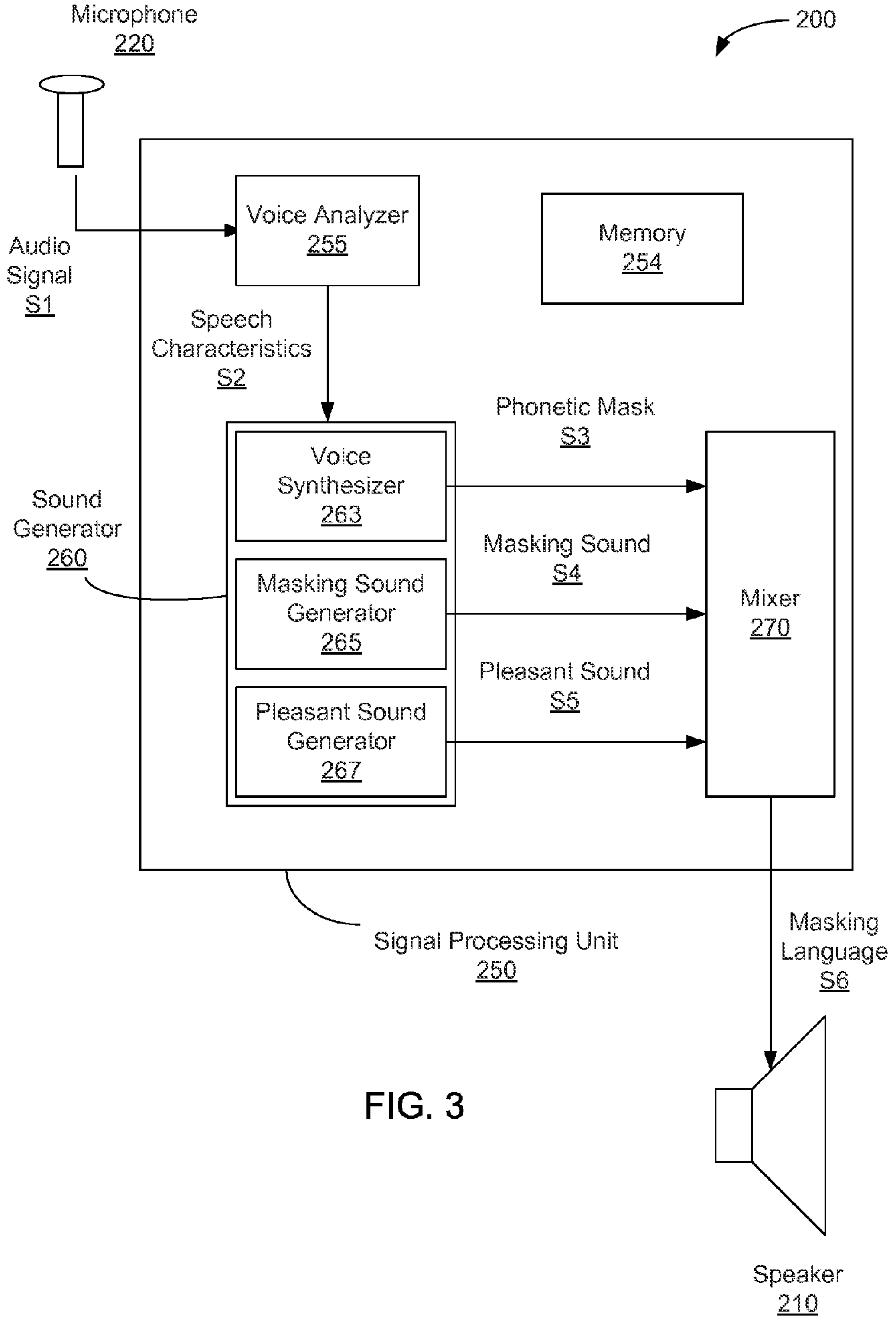
FIG. 3 is a portion of a speech masking apparatus including a signal processing unit, according to an embodiment.

Some embodiments described herein relate to methods and apparatus suitable for masking conversations in a medical setting. Such conversations may include sensitive medical and/or patient information. Such patient information can be regulated by federal privacy laws specifying medical professionals to take measures to prevent unintended listeners from overhearing such conversations. Some such conversations can occur in common areas of medical facilities, such as shared rooms, emergency rooms, pre- and post-operative care areas, and intensive care units. Some embodiments described herein can mask private conversations in such common areas and can prevent or significantly reduce the unauthorized dissemination of confidential medical information.

In some embodiments described herein, a portable speech masking apparatus can be positioned in an area where speech masking is desired. For example, some embodiments described herein can be mounted to and/or hung from a standard I.V. pole, and/or a vital/blood pressure pole, such that the apparatus can be located adjacent to a patient, located and/or relocated to improve the conversation masking effect, operable to travel with the patient, and/or operable to be easily moved from area to area. In other embodiments, the apparatus can be configured to be placed on a table, wall mounted, ceiling mounted, and/or positioned by any other suitable means.

A speech masking apparatus can output phonemes, superphonemes, psuedophonemes, and/or intelligible human speech, e.g., from a speaker. Phonemes can be the basic distinctive units of speech sound, and can vary in duration from approximately one millisecond to approximately three-hundred milliseconds. Superphonemes can be combinations and/or superpositions of phonemes, and/or pseudophonemes, and can vary in duration from about three milliseconds to several seconds. For example, some superphonemes can be syllabic and can have durations greater than about three hundred milliseconds. Psuedophonemes can resemble units of human speech and can be, for example, fragments of animal calls. Intelligible human speech can be recorded and/or synthesized words, phrases, and/or sentences that can be comprehended by a human listener.

In some embodiments, an apparatus can include a microphone configured to detect a sound including one or more human voices, for example, the voices of an individuals engaged in a private conversation. Each human voice can have a characteristic pitch, volume, theme, and/or phonetic content.

A signal analyzer can be operable to determine the pitch, the volume, the theme, and/or the phonetic content of the sound. For example, the signal analyzer can be operable to determine the pitch, the volume, the theme, and/or the phonetic content of the one or more human voices.

A synthesizer can be configured to generate a masking language operable to obfuscate the private conversation. The synthesizer can be operable to generate and/or select phonemes, superphonemes, pseudophonemes, intelligible human speech, and/or other suitable sounds and/or noises to produce a masking language.

A speaker can output the masking language, which can include one or more components, including, but not limited to, phonemes, superphonemes, pseudophonemes, background noise, and/or clear sounds (e.g., a tonal noise, a prerecorded audio track, a musical composition). In some embodiments, at least one component of the masking language can resemble human speech and/or can be intelligible human speech. One or more of the components of the masking language can have a pitch, a volume, a theme, or a phonetic content substantially matching the pitch, the volume, the theme, and/or the phonetic content of the human voice detected by the microphone. In some embodiments, more than one speaker can output the masking language. In such an embodiment, the volume, the frequency, and/or any other suitable characteristic of at least one component of the masking language can be varied across the speakers.

In some embodiments, the apparatus can include a soundboard, which can be located between the microphone and the speaker. The soundboard can be configured to at least partially acoustically isolate the speaker from the microphone.

FIGS. 1 and 2 are a top view and a side view, respectively, of a speech masking apparatus 100, according to an embodiment. The speech masking apparatus includes two speakers 110, two microphones 120, and a signal processing unit 150. The speakers 110 and/or the microphones 120 can be mounted to a soundboard 130. The speech masking apparatus 100 can be coupled to a pole 140.

The microphones 120 can be operable to detect acoustic signals, such as a private medical conversation. The microphones 120 can convert the acoustic signals into electrical signals, which can be transmitted to the signal processing unit 150 for analysis. In some embodiments, the microphones 120 can be operable to also detect the output from the speakers 110. For example, the microphones 120 can be operable to detect feedback or sound output from the speakers 110.

The signal processing unit 150 includes a processor 152 and a memory 154. The memory 154 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 154 can store instructions to cause the processor 152 to execute modules, processes, and/or functions associated with voice analysis and/or generating a masking language.

The processor 152 can be any suitable processing device configured to run and/or execute signal processing and/or signal generation modules, processes and/or functions. For example, the signal processing unit 150, using the signals from the microphones 120, can be operable to determine the pitch, direction, location, volume, phonetic content, and/or any other suitable characteristic of the conversation.

As used herein, a module can be, for example, any assembly and/or set of operatively-coupled electrical components, and can include, for example, a memory (e.g., the memory 154), a processor (e.g., the processor 152), electrical traces, optical connectors, software (executing or to be executed in hardware) and/or the like. Furthermore, a module can be capable of performing one or more specific functions associated with the modules, as discussed further below.

The signal processing unit 150 can transmit a signal to the speakers 110, such that the speakers 110 output a masking language, e.g., a noise operable to obfuscate a private conversation. The masking language can comprise, for example, phonemes, background noise, speech tracks, party noise, pleasant sounds, clear tunes, and/or alerting sounds. The masking language can have a pitch, a volume, a theme, and/or a phonetic content substantially matched to the private conversation.

The soundboard 130 separates the speakers 110, mounted on a first side 132 of the soundboard 130, from the microphones 120, mounted on the second side 132 of the soundboard 130, opposite the first side 132. The soundboard 130 can be operable to at least partially acoustically isolate the speakers 110 from the microphones 120. Similarly stated, in some embodiments, the speakers 110 and the microphones 120 can be mounted in relatively close proximity; the soundboard 130 can prevent the output of the speakers 110 from interfering with the ability of the microphones 120 to detect other sounds, such as the private conversation. For example, the soundboard 130 can be constructed of sound absorbing fiberboard, be covered in sound absorbing foam and/or fabric, and/or otherwise be operable to absorb acoustic energy.

The speech masking apparatus 100 can be positioned such that the microphones 120 are directed towards the private conversation and the speakers 110 are directed towards the unintended listener with the soundboard 130 positioned therebetween. Furthermore, as shown, the soundboard 130 can be curved and/or have a concave surface such that it can direct the output of the speakers 110 towards the unintended listener and/or away from the private conversation. In this way, the speech masking apparatus 100 can be less distracting to the parties engaged in the conversation.

In some embodiments, the soundboard 130 can be approximately 6 to 36 inches wide, approximately 6 to 36 inches tall, and/or approximately 2 to 10 inches deep. The soundboard 130 can have a radius of curvature, for example, of approximately 2 to 48 inches. In some embodiments, the soundboard can have a shape approximating a parabola or an ellipse with a focal distance of 3-10 feet. In some embodiments, the soundboard 130 can be sized to contain the speakers 110, the microphones 120, and/or the signal processing unit 150 in a portable unit. The soundboard 130 can contain mounting hardware to mount the speech masking apparatus 100, such as hooks, loops, straps, and/or any other suitable devices.

In some embodiments, the speakers 110 and/or the microphones 120 can be positioned to facilitate stereolocation of the private conversation and/or the masking language. Similarly stated, in some embodiments, the microphones 120 can be spaced a distance apart, such that the relative location of private conversation can be located based on the time delay between when a sound wave is detected by various microphones. Similarly, in some embodiments, the speakers 120 can be positioned such that the signal processing unit 150 can use stereo and/or pseudostereo effects (i.e., providing signals with variations in volume, time, frequency, etc. to various speakers) to cause the unintended listener to perceive that the masking language is emanating from a particular location (e.g., a location other than the speakers, such as the location of the private conversation) and/or a moving location.

The speech masking apparatus 100 can be mounted on the pole 140. The pole can be, for example, an IV pole, a vital/blood pressure pole, and/or any other suitable pole. In some embodiments, the pole can include a wheeled base, which can ease transport and/or positioning of the speech masking apparatus 100. For example, a doctor can position the speech masking apparatus 100 such that the microphones 120 are directed towards a patient, and the speakers are directed towards an unintended listener, such as a hospital roommate before engaging in a private conversation.

FIG. 3 is a portion of a speech masking apparatus 200 including a signal processing unit 250, according to an embodiment. The speech masking apparatus further includes a microphone 220 and a speaker 210.

The signal processing unit 250 can be structurally and/or functionally similar to the signal processing unit 150, as describe above with reference to FIGS. 1 and 2. For example, the signal processing unit 250 can accept a signal S1 from a microphone 210, generate a masking language based on signal S1, and output the masking language signal S6 to a speaker 220.

The signal processing unit 250 can include a memory 254, which can, for example, store a set of instructions for analyzing the audio signal S1 and/or generating the masking language and/or otherwise processing audio inputs and/or generate audio outputs. The memory 254 can further include or store a library of phonemes, speech-like sounds, masking sounds, clear sounds, and/or pleasant sounds.

The signal processing unit 250 can include one or more general and/or special purpose processors (not shown in FIG. 3) configured to run and/or execute signal processing and/or signal generation modules, processes, and/or functions. For example, the signal processing unit 250 can include a processor operable to execute a voice analyzer module 255, a sound generator module 260, and/or a mixer module 270.

The microphone 210 can detect an audio signal S1, which can be transmitted to the voice analyzer module 255. The voice analyzer module 255 can be operable to analyze the audio signal S1, and can determine whether the audio signal S1 includes human speech, such as a private conversation. The voice analyzer 255 can further be operable to determine a volume and/or a pitch associated with the human speech present in the audio signal S1. In some embodiments, the voice analyzer 255 can be operable to detect and/or analyze the number of human speakers, the location(s) of the person(s) speaking (e.g., using at least two microphones 220 to stereolocate the person or persons speaking), the language of the speech, the theme of the speech, the phonetic content of the speech, and/or any other suitable feature or characteristic associated with speech contained in the audio signal S1.

The voice analyzer 255 can send information about the speech, such as the volume, the pitch, the theme, and/or the phonetic content to a sound generator 260, as shown as signal S2. In some embodiments, signal S2 can further include information about non-speech components of the audio signal S1, such as, information about background noise.

The sound generator 260 can include a voice synthesizer 263, a masking sound generator 265, and/or a pleasant sound generator 267.

The voice synthesizer 263 can be operable to select phonemes, superphonemes, pseudophonemes, and/or other suitable sounds and/or noises to generate and/or output a phonetic mask, as shown as signal S3. For example, the voice synthesizer 263 can be operable to access the memory 254, which can store a library of phonemes, superphonemes, pseudophonemes, etc. In some embodiments, the phonemes, superphonemes, and/or pseudophonemes can resemble human speech.

In some embodiments, the speech masking apparatus 200 can be intended for use in a particular setting, such as a medical setting, a military setting, a legal setting, etc. In such an embodiments, the memory 254 can store a library of theme-matched words, phrases, and/or conversations. For example, in an embodiment where the speech masking apparatus is intended to be used in a medical setting, the memory 254 can store words, jargon, and/or phraseology characteristic of a medical conversation such as anatomical words (e.g., cardiac, distal, pulmonary, renal, etc.) and/or other typically medical words (e.g., syringe, catheter, surgery, stat, nurse, doctor, patient, etc.) that are statistically more likely to occur in a medical setting than in general conversation. Similarly, medically themed intelligible human speech can include a pre-recorded conversation such as a doctor-patient conversation, a doctor-nurse conversation, etc. In embodiments where the speech masking apparatus 200 is intended for use in other settings, the memory 254 can be pre-configured to contain thematically setting appropriate content. For example, in an embodiment where the speech masking apparatus 200 is intended for use in a military facility, the memory 254 can be pre-loaded with thematically characteristic words, jargon, phrases, sentences, and/or conversations (e.g., can contain an increased incidence of words such as soldier, officer, commander, mess, weapon, sergeant, patrol, etc.) A speech masking apparatus 200 could be similarly pre-configured for a legal setting, e.g., the memory could store words, phrases, etc. overrepresented in the legal conversations (e.g., client, privilege, court, judge, litigation, discovery, estoppel, statute, etc).

In other embodiments, the voice analyzer 255 can be operable to perform speech recognition methods to analyze the audio signal S1 for thematic characteristics. For example, the voice analyzer can be operable to perform statistical techniques based, for example, on word frequency, to determine a theme of the private conversation. In such an embodiment, signal S2 can include information about the theme of the private conversation, such that the voice synthesizer selects thematically similar words from the memory 254.

The phonetic mask S3 output by the voice synthesizer 263 can include the phonemes, superphonemes, intelligible speech, and/or pseudophonemes combined based on the phonetic content of the private conversation. For example, the voice synthesizer 263 can select phonemes substantially matched to the phonetic content of the private conversation. The phonetic mask S3 can include phonemes, superphonemes, intelligible pre-recorded speech and/or pseudophonemes selected and/or combined to confuse the unintended listener and/or interfere with the ability of the unintended listener to process the conversation.

The voice synthesizer 263 can select, modulate, and/or synthesize phonemes, superphonemes, and/or pseudophonemes such that the phonetic mask S3 has a similar phonetic content, pitch, volume, and/or theme as the private conversation. In some such embodiments, the voice synthesizer 263 can be operable to select intelligible pre-recorded conversations to substantially match the phonetic content, pitch and/or volume of the private conversation, and/or to be able to alter the intelligible pre-recorded conversations to match the phonetic content, pitch, and/or volume of the private conversation. In some embodiments, the voice synthesizer 263 can synthesize intelligible human speech substantially matched to the private conversation.

In addition or alternatively, the voice synthesizer 263 can be operable to engage in matrix filling. Similarly stated, in some instances, the voice synthesizer 263 can be operable to select and/or synthesize phonemes, superphonemes, intelligible pre-recorded speech (e.g., substantially thematically matched intelligible speech), and/or pseudophonemes to fill periods of silence that occur in the private conversation at a volume and/or pitch similar to the private conversation. In some instances, the voice synthesizer 263 is operable to play back at least portions of the private conversation with an induced delay.

The masking sound generator 265 can output a masking sound, as shown as signal S4. The masking sound S4 can include a filling noise, and/or a noise cancellation sounds, such as ultrasound, white noise, gray noise, and/or pink noise.

The pleasant sound generator 267 can be operable to output pleasant sounds and/or clear sounds, as shown as signal S5. Pleasant sounds S5 can include, for example, classical music and/or natural sounds, such as rain, ocean noises, forest noises, etc. Clear sounds can be, for example, sounds relatively easily recognized by the unintended listener, such as a coherent audio track reproduced with relatively high fidelity, such as a single frequency tone, a chord progression, a musical track, and/or any other sound, such as a train, bird song, etc. In some embodiments, in addition to, or instead of pleasant sounds and/or clear sounds, the pleasant sound generator 267, can output alerting sounds, such as, for example, alarms, crying babies, and/or braking glass, which can tend to draw the unintended listener's attention. In some embodiments, the pitch of the pleasant sound S5 can be selected based on the pitch of the private conversation.

The mixer 270 can be operable to combine the phonetic mask S3, the masking sound S4, and/or the pleasant sound S5. The mixer 270 can output a masking language S6 to the speaker 210. The speaker 210 can convert the masking language S6 signal into an audible output. The volume of the mixing language S6, and each component thereof (e.g., the phonetic mask S3, the masking sound S4, the pleasant sound S5) can be selected, altered, and/or varied by the mixer 270. For example, the mixer 270 can set the volume of the pleasant sounds S5 relative to the phonetic mask S3 such that the pleasant sound S5 occupies the auditory foreground, while the phonetic mask S3 occupies the auditory background. In this way, the masking language S6 can be less disconcerting and/or the pleasant sound S5 can provide an auditory focal point for the unintended listener. Similarly stated, the mixer 270 can tune the pleasant sound S5 to provide a psychological reference point for the unintended listener, which can draw the unintended listener's focus away from the confusing and/or unintelligible phonetic mask S3. The pleasant sound S5 component of the masking language S6 can draw the unintended listener's attention, dissuade, and/or prevent the unintended listener from concentrating on and/or attempting to decipher the private conversation. Furthermore, the pleasant sounds S5 can be operable to render the masking language output by the speakers 210 pleasant to the unintended listener.

In some embodiments, such as embodiments in which the speech masking apparatus 200 has two or more speakers, the mixer 270 can modulate playback of one or more components of the masking language S6 in time, volume, frequency, and/or any other appropriate domain, such that a stereo or pseudostereo effect affects the unintended listener's ability to localize the source of the sound. For example, the speech masking apparatus 200 can be operable to play one or more component of the masking language S6 such that the unintended listener perceives the source of the component to be moving and/or located apart from the area in which the private conversation is taking place. For example, the speech masking apparatus 200 can be operable to stereolocate a first masking sound, such as the phonetic mask S3 in the vicinity of the private conversation. The speech masking apparatus 200 can also be operable to stereolocate a second component, such as a clear sound and/or a pleasant sound S5, such as a strain of classical music, the sound of a train passing, and/or any other suitable sound, configured to be played using the multiple speakers, such that the unintended listener interprets the source of the second masking sound to be moving around the room.

Figure 4:
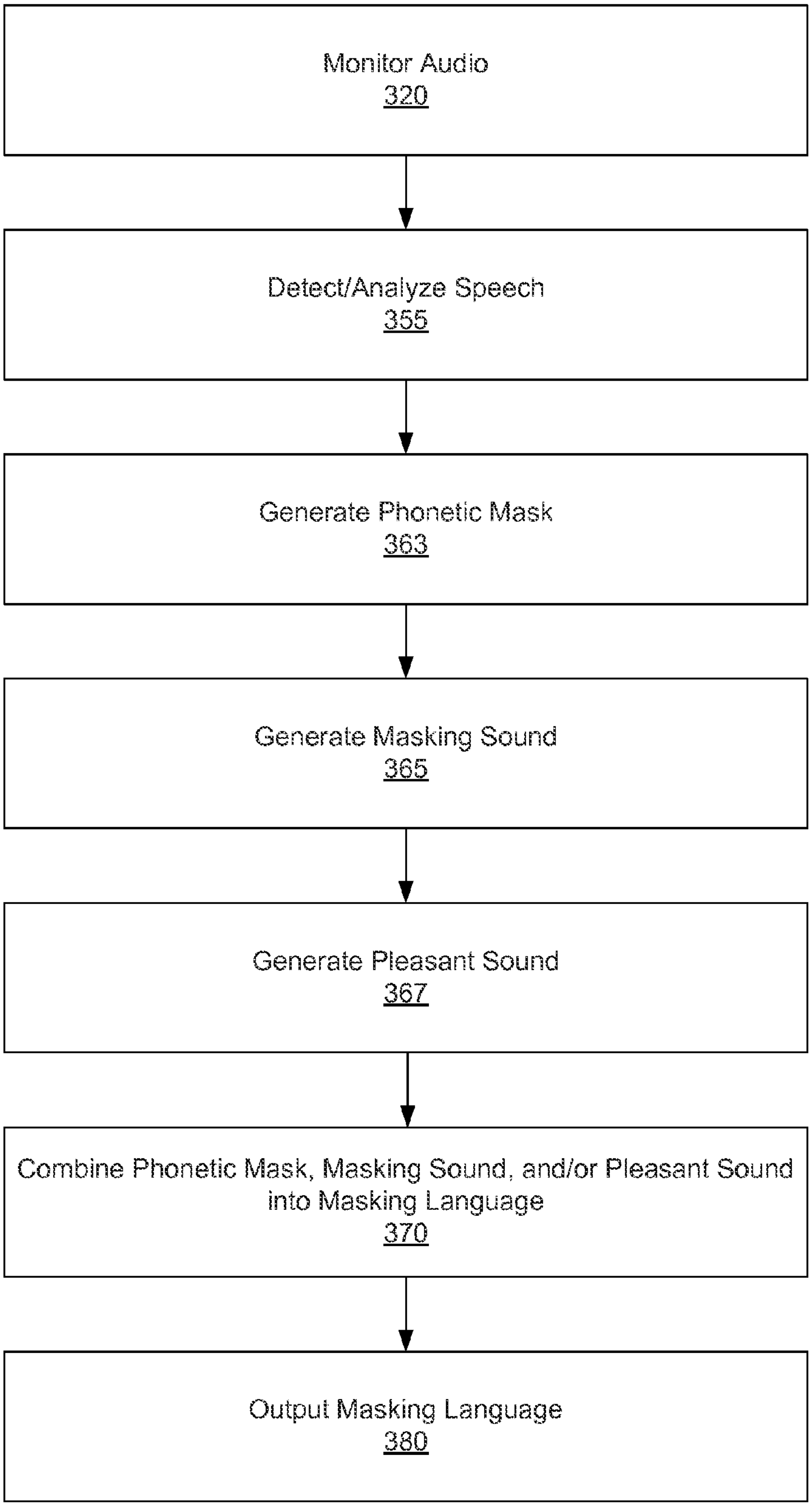
FIG. 4 is a flow chart illustrating a method for masking a private conversation, according to an embodiment.

FIG. 4 is a flow chart illustrating a method for masking a private conversation, according to an embodiment. Audio can be monitored, at 320. For example, a microphone, e.g., the microphones 120 and/or 220, as shown and described with reference to FIGS. 1-2 and FIG. 3, respectively, can be operable to monitor audio, which can include, for example, a private conversation and/or background noise. In some embodiments, the microphone can be operable to detect and convert an audio input to an electrical signal for processing (for example by the signal processing unit 150 and/or 250, as shown and describe with reference to FIGS. 1-2 and FIG. 3, respectively.

The audio (e.g., a signal representing the audio) can be processed to detect whether it contains speech, at 355. For example, the voice analyzer 255, as shown and described with respect to FIG. 3, can process a signal representing the audio. The voice analyzer 255 can be operable to determine whether the audio detected by the microphone contains a speech component. If the audio includes speech, the speech can be analyzed for volume, pitch, location, phonetic content, and/or any other suitable parameter, at 355.

At 363, a phonetic mask can be generated. For example, the voice synthesizer 263, as shown and described with respect to FIG. 3 can select phonemes, superphonemes, intelligible prerecorded speech, and/or pseudophonemes based on the content of the speech. Similarly, at 365, a masking sound can be generated, and, at 367, a pleasant sound can be generated, for example, by the masking sound generator 265 and the pleasant sound generator 267, as shown and described with respect to FIG. 3. The phonetic mask, the masking sound, and/or the pleasant sound can be combined into a masking language, at 370. For example, a combination and/or superposition of phonemes resembling intelligible speech output from a voice synthesizer can be combined with a pleasant sound, such as classical music, and/or static, at 370. The masking language can be output, for example, via a speaker, at 380.

In some embodiments, a speech masking apparatus can include a testing mode. The testing mode can be used to configure the speech masking apparatus for a particular acoustic environment. In some embodiments, the testing mode can be engaged, for example, when the speech masking apparatus is moved to a new location and/or when the speech masking apparatus is first turned on. In the testing mode, the speech masking apparatus can emit one or more tones from one or more speakers, such as a single frequency test tone, a frequency sweep, and or any other sound. The one or more microphones can detect the output of the speakers and/or any feedback and/or reflections of the output of the speakers. The speech masking apparatus can thereby calculate certain characteristics of the auditory environment, such as sound propagation, degree of reverberation, etc. The testing mode can allow the speech masking apparatus to calibrate masking outputs for a specific acoustic space, for example, the signal processing unit can be operable to modulate the volume of the masking language based on the testing mode.

While various embodiments have been described above, it should be understood that they have been presented by way of example only, and not limitation. For example, although the speech masking apparatus 100 of FIGS. 1 and 2 is shown as having two speakers 110 and two microphones 120, in other embodiments, the speech masking apparatus 100 can have any number of speakers 110 and/or microphones 120. Furthermore, although the speakers 110 and microphones 120 are shown and described as mounted to the soundboard 130, in other embodiments the speakers and/or the microphones can be mounted to the pole 140, or otherwise positioned to detect and/or mask speech, (e.g., mounted on walls, placed adjacent to the individuals engaging in the private conversation and/or unintended listeners, and/or otherwise positioned in the area of the private conversation).

As another example, as shown, in FIG. 1 the speakers 110 are mounted on a first side 132 of the soundboard 130, while the microphones 120 are mounted on a second side 134 of the soundboard 130 opposite the first side 132. In other embodiments, at least one microphone 120 can be mounted on each side of the soundboard 130. In such an alternate embodiment, the speech masking apparatus 100 can be positioned such that a first microphone 120, located on the first side 132 of the soundboard 130, is directed towards the private conversation, such that the private conversation can be detected and/or analyzed. A second microphone 120 can be located on the second side 134 of the soundboard 130 and be operable to detect the masking language emitted from the speakers 110. In this way, the second microphone can be operable to evaluate the efficacy of the masking language, and/or provide feedback to the speech masking apparatus 100 to enable the speech masking apparatus 100 to modulate the masking language volume, pitch, phonetic content, and/or other suitable parameter to improve the effectiveness of masking and/or the comfort of the unintended listener. In other embodiments, a microphone 120 mounted on the first side 132 of the soundboard 130 can be operable to evaluate the efficacy of the masking language.

Additionally, although the soundboard 130 is described as operable to absorb acoustic energy, in some embodiments, the soundboard 130 can additionally or alternatively be configured to project sound emanating from the speakers 110. Similarly, although the sound board 130 is shown and described as curved, in other embodiments, the sound board 130 can be substantially flat, angled, or have any other suitable shape. In some embodiments, the soundboard 130 can have a concave surface and a substantially flat surface.

Although some embodiments are described herein as relating to providing speech masking in a medical setting, in other embodiments, speech masking can be provided in any setting where privacy is desired, such as law offices, accounting offices, government facilities, etc.

Some embodiments described herein refer to an output, such as a masking language, matched or substantially matched to an input, such as a private conversation. Matching and/or substantially matching can refer to selecting, generating, and/or altering an output based on a parameter associated with the input. An output can be described as substantially matched to the input if a parameter associated with the input and a parameter associated with the output are, for example, equal, within 1% of each other, within 5% of each other, within 10% of each other, and/or within 25% of each other.

For example, the apparatus can be configured to measure the frequency of a private conversation and select, generate, and/or alter a masking language such the masking language has a frequency within 5% of the private conversation. In some embodiments, the apparatus can calculate a moving average, a mean and standard deviation, a dynamic range, and/or any other appropriate measure of the input and select, generate, and/or alter the output accordingly. For example, a private conversation can have a frequency that varies within a range over time; the apparatus can generate a masking language that has similar variations.

A conversation can have two or more participants, a value of a parameter associated with the speech of each participant having a different value. For example, in a conversation having two participants, each participant's speech can have different characteristics, such as pitch, volume, phonetic content, etc. In some embodiments, the apparatus can measure and/or calculate one or more parameters associated with each participant. The apparatus can substantially match a constituent of the masking language to a single participant and/or to the aggregate conversation. In some embodiments, the apparatus can substantially match one or more constituent components of the masking language to each participant in the private conversation.

As used herein, the singular forms "a," an," and "the" include plural references unless the context clearly dictates otherwise. Thus, for example, the term "a processor" is intended to mean a single processor, or multiple of processors.

Where methods described above indicate certain events occurring in certain order, the ordering of certain events may be modified. For example, although, with respect to FIG. 4, generating a phonetic mask, at 363, is shown and described as occurring before generating a masking sound, at 365, which is shown and described as occurring before generating a pleasant sound, at 367. In other embodiments, generating a phonetic mask, at 363, generating a masking sound, at 365, and/or generating a pleasant sound, at 367, can occur in simultaneous, or in any order. Additionally, certain of the events may be performed repeatedly, concurrently in a parallel process when possible, as well as performed sequentially as described above.

What is claimed is:

1. An apparatus, comprising:

a microphone configured to detect a voice of a human;

a speaker configured to output a masking language, the masking language including phonemes resembling human speech, the phonemes having at least one of a pitch, a volume, a theme, or a phonetic content substantially matching a pitch, a volume, a theme, or a phonetic content of the voice;

a soundboard located between the microphone and the speaker, the soundboard configured to at least partially acoustically isolate the output of the speaker from the microphone; and a moveable mounting pole coupled to the soundboard such that the apparatus can be moved from a first location to a second location.

2. The apparatus of claim 1, wherein the phonemes form intelligible human words.

3. The apparatus of claim 1, wherein the human is a first human, the microphone is configured to detect a voice of a second human, a first component of the masking language including the phonemes, a second component of the masking language having at least one of a pitch, a volume, a theme, or a phonetic content substantially matching a pitch, a volume, a theme, or a phonetic content of the voice of the second human.

4. The apparatus of claim 1, wherein a surface of the soundboard has a concave shape.

5. The apparatus of claim 1, further comprising:

a memory storing a plurality of recordings of intelligible human speech; and a processor configured to select a recording from the plurality of recordings such that the theme of the selected recording substantially matches the theme of the voice.

6. The apparatus of claim 1, wherein the masking language further includes at least one of superphonemes or pre-recorded human speech.

7. The apparatus of claim 1, wherein the speaker is a first speaker, the apparatus further comprising a second speaker, at least one component of the masking language output from the first speaker having a first frequency and a first volume, the at least one component of the masking language output from the second speaker having at least one of (1) a second frequency different from the first frequency or (2) a second volume different from the first volume.

8. The apparatus of claim 1, wherein the phonetic content of the phonemes substantially matches the phonetic content of the voice.

9. An apparatus, comprising:

a signal analyzer operable to determine at least one of a pitch, a volume, a theme, or a phonetic content of an audio signal having a voice of a human; and a synthesizer configured to generate a masking language including phonemes resembling human speech, the masking language having at least one of a pitch, a volume, a theme, or a phonetic content substantially matching the pitch, the volume, the theme, or the phonetic content of the voice, the synthesizer configured to transmit the masking language to a plurality of speakers, the masking language including at least one of a tonal noise, a pre-recorded audio track, or a musical composition, the synthesizer configured to transmit the at least one of the tonal noise, the pre-recorded audio track, or the musical composition to the plurality of speakers such that a first speaker of the plurality of speakers projects the at least one of the tonal noise, the pre-recorded audio track, or the musical composition with a first volume and a first frequency, and a second speaker from the plurality of speakers projects the clear sound with a second volume and a second frequency, at least one of (1) the first volume is different from the second volume or (2) the first frequency is different from the second frequency.

10. The apparatus of claim 9, further comprising a soundboard, the microphone disposed on a first side of the soundboard, the plurality of speakers disposed on a second side of the soundboard, the second side opposite the first side.

11. The apparatus of claim 9, wherein the masking language includes intelligible speech similar to the voice in pitch and volume.

12. The apparatus of claim 9, wherein the masking language includes at least one of white noise, gray noise, pink noise, or ultrasound.

13. The apparatus of claim 9, further comprising a soundboard, a surface of the soundboard having a curved shape configured to direct an output of the speakers in a first direction, the soundboard configured to attenuate the output of the speakers in a second direction, the second direction opposite the first direction.

14. The apparatus of claim 9, further comprising:

a memory storing a plurality of recordings of intelligible human speech; and a processor configured to select a recording from the plurality of recordings such that at least one of the pitch, the volume, the theme, or the phonetic content of the recording substantially matches at least one of the pitch, the volume, the theme, or the phonetic content of the voice.

15. The apparatus of claim 9, wherein the masking language includes human speech, a theme of the human speech substantially matching the theme of the voice.

16. A method, comprising:

identifying at least one of a pitch, a volume, a theme, or a phonetic content of a sound having human voice;

generating a masking language, the masking language including a plurality of phonemes based on at least one of the pitch, the volume, the theme, or the phonetic content of the sound, the masking language further including at least one of a tonal noise, a pre-recorded audio track, or a musical composition; and transmitting the masking language to a plurality of speakers such that the at least one of the tonal noise, the pre-recorded audio track, or the musical composition is emitted having a first volume and a first frequency at a first speaker of the plurality of speakers, the clear tone having a second volume and a second frequency at a second speaker of the plurality of speakers, at least one of (1) the first volume different from the second volume, or (2) the first frequency different from the second frequency.

17. The method of claim 16, wherein the plurality of phonemes includes intelligible human words.

18. The method of claim 16, wherein the plurality of phonemes has a theme substantially matching the theme of the voice.

19. An apparatus, comprising:

a microphone configured to detect a voice of a human;

a speaker configured to output a masking language including intelligible human words having at least one of a pitch, a volume, a theme, or a phonetic content substantially matching a pitch, a volume, a theme or a phonetic content of the voice, and a musical composition having a volume greater than the volume of the intelligible human words; and a soundboard located between the microphone and the speaker, the soundboard configured to at least partially acoustically isolate the output of the speaker from the microphone.

* * * * *